United States Patent Office 3,780,120
Patented Dec. 18, 1973

3,780,120
PROCESS FOR MANUFACTURING LINEAR ALKYL BENZENES
Benedetto Calcagno, Milan, Roberto Canavesi, Bollate, and Natale Bertolini, Milan, Italy, assignors to Società Italiana Resine S.I.R. S.p.A., Milan, Italy
No Drawing. Filed Mar. 22, 1972, Ser. No. 236,999
Claims priority, application Italy, Mar. 23, 1971, 22,112/71
Int. Cl. C07c 3/52
U.S. Cl. 260—671 B     6 Claims

ABSTRACT OF THE DISCLOSURE

Linear alkyl benzenes are prepared, by catalytic alkylation of benzene by chloro-paraffins, in a process in which recycled paraffins are subjected to hydrogenation to ensure that a high-grade product with respect to chlorine content and odor is produced.

---

The present invention relates to improvements in processes for manufacturing linear alkyl benzenes, more particularly alkyl benzenes in which the alkyl radical is constituted by a linear paraffin chain containing 9 to 15 carbon atoms.

As is well known, such products are very important in the manufacture of biologically degradable detergents.

Alkyl benzenes which have the alkyl substituent constituted by a linear paraffin chain are normally prepared, in industrial practice, by chlorination of linear paraffins, catalytic alkylation of benzene with the chlorinated paraffins obtained, separation of the catalyst, and fractionation of the alkylation product into its components.

In such processes, in order to obtain the maximum yield of monochloro paraffins, the chlorination phase is carried out with a high molar ratio of paraffins to chlorine.

The mixture of chlorinated paraffins and unreacted paraffins obtained, in view of difficulties of separation, is passed directly to the alkylation stage, and the unreacted paraffins are subsequently recovered by distillation of the products of alkylation and recycled to the chlorination stage. It has been found that in the processes described, in time, by-products accumulate both in the recycled paraffins and in the alkyl benzenes produced.

More particularly, chlorinated products accumulate in the alkyl benzenes, so that the chlorine concentration may reach undesired levels; furthermore, such alkyl benzenes often have unpleasant odors. The causes of this phenomenon are not completely known. Probably, it is due inter alia to products which form by degradation of the alkyl benzenes as well as to products which form by alkylation of the benzene with products of degradation of the paraffins.

These products when they are recycled together with the paraffins may undergo further changes in the chlorination and alkylation stages, forming heavier products which, at the subsequent distillation stage, separate with the alkyl benzenes.

In any case, whatever the causes, the processes described have the disadvantage of producing alkyl benzenes which are high in impurities, particularly chlorinated products; are often unpleasant in odor; and have other undesirable characteristics, particularly a corrosive and toxic action.

All this creates problems which are difficult to solve, because it is necessary for commercial alkyl benzenes used in detergents to be substantially free of chlorine and unpleasant odors.

A process for the production of linear alkyl benzenes by alkylation of benzene with chlorinated paraffins, by which it is possible to avoid the aforesaid disadvantages, forms the subject matter of our Italian Pat. No. 839,022. More particularly, by using such a process, it is possible to obtain linear alkyl benzenes with an extremely low content of by-products, more particularly chlorinated by-products, and free of undesirable odors.

More particularly, according to this process, the recycled products, which essentially comprise paraffins, are subjected to a treatment at elevated temperature with concentrated sulphuric acid, oleum, or sulphur trioxide, and the product obtained, after cooling, is decanted in order to separate the acid sludge. The paraffins finally isolated are fed back to the chlorination stage.

This is a simple and particularly advantageous process which makes it possible to obtain high-grade linear alkyl benzenes directly, with no need for further treatments of the alkyl benzenes themselves.

It should be noted that in order to obtain high-grade linear alkyl benzenes directly by a continuous process, it is not sufficient simply to use fresh pure or practically pure paraffins; it is essential to subject the recycled paraffins to the above treatment.

This process does however involve a loss, though less than 0.5% of paraffins which are subjected to the acid treatment.

We have now found that it is possible to obtain linear alkyl benzenes of further improved characteristics with no substantial losses of product, in processes in which the alkyl benzenes are obtained by catalytic alkylation of benzene with mixtures obtained by partial chlorination of linear paraffins having from 9 to 15 carbon atoms in the molecule, if the recycled paraffins, high in impurities, are subjected to a suitable hydrogenation treatment.

This treatment may be carried out continuously or intermittently, on the whole of the recycled paraffins or on a part thereof, and in such a way as to remove the impurities substantially completely or keep them below critical limits. In any case, by using the process according to the present invention, it is possible to obtain high-grade linear alkyl benzenes, which have no disagreeable odors, with a chlorine content below 20 p.p.m. and with a negligible content of the other by-products normally present.

In carrying out the objects of the present invention, the recycled paraffins, which are high in impurities, are subjected to hydrogenation in the presence of a supported catalyst of the platinum family, at a temperature between 50 and 300° C., preferably 150 to 200° C., and a pressure from 1 to 40 kg./sq. cm., preferably 5 to 20 kg./sq. cm.

More precisely according to this process, the recycled paraffins are fed to a standard hydrogenation reactor with the catalyst in a fixed bed form, the rate of supply ranging from 0.1 to 2 litres of recycled liquid paraffin per litre of catalyst and per hour. Under these conditions, pure hydrogen or gases containing hydrogen with a hydrogen content of not less than 70% are fed to the reactor so that the hydrogen/paraffin ratio is comprised in the range from 1:1 to 10:1 by volume, and preferably around 5 to 6:1. Elements which belong to the platinum family (platinum, rhodium, ruthenium, iridium, palladium, nickel, cobalt), are used as catalysts, in the form of the metal supported on a sub-divided inert medium such as for example alumina, active carbon, silica gel, kieselguhr and others.

The supports may be used in the form of small extruded cylinders or in irregular non-uniform lumps.

In the preferred embodiment of the present invention, palladium metal is used and is supported on alumina in the form of small cylinders 4 mm. in size, with a weight ratio of palladium metal to support in the range 0.001 to 0.1:1.

The product obtained after this treatment is supplied directly to the chlorination reactor. The chlorination mixture is then used directly in the alkylation of benzene to form linear alkyl benzenes.

The resulting linear alkyl benzenes are distinguished by the absence of disagreeable odors and by a chlorine content less than 10 p.p.m. and a content of other by-products usually present amounting to less than 0.05% by weight.

The invention will now be illustrated by the following example, which is not intended however to constitute any limitation on the invention itself.

EXAMPLE 230 kg./hr. approximately of gaseous chlorine and 1650 kg./hr. of linear paraffins $C_{10}$ to $C_{14}$ constituted by recycled paraffins to the extent of 70%, the remaining 30% consisting of fresh commercial paraffins, are fed into a tubular reactor. The composition of the n-paraffins in percentages by weight determined by gas-chromatographic analyses, was as follows:

$C_{10}=12.2\%$; $C_{11}=38.4\%$; $C_{12}=30.1\%$; $C_{13}=12.7\%$; $C_{14}=6.6\%$

Chlorination of the paraffins was carried out at a temperature of approximately 110° C.

The products of chlorination, freed from hydrochloric acid by degasification, were then fed to the alkylation stage together with 980 kg./hr. of catalytic sludge.

The latter consisted of spent products discharged from the reactor and enriched with aluminium trichloride in a quantity equal to approximately 10% of the sludge. At this stage, two series-connected reactors fitted with stirrers were used, thereby avoiding the presence of unreacted chloroparaffins in the effluent mixture.

The reaction temperature was equal to 60° C. and the volume of the two reactors allowed a total residence time of approximately 1 hour under the alkylation conditions.

The alkylation effluent was then decanted in order to separate off the catalytic sludge, washed with a 5% soda solution and then with water to neutrality, and finally fractionated to separate benzene, unaltered paraffins and alkyl benzenes. 1150 kg./hr. approximately of paraffins were recovered, for recycling, and approximately 610 kg./hr. of alkyl benzenes.

At the bottom of the alkyl benzene distillation column, heavy products were recovered in a quantity of about 90 kg./hr.

By proceeding in this way, a progressive increase was noted in the chlorine content of the alkyl benzenes and in the by-product content of the recycled paraffins.

When the chlorine content of the alkyl benzenes reached the level of 200 p.p.m., the paraffins recovered at the distillation stage, in a quantity equal to 1150 kg./hr. approximately, were not directly recycled to the chlorination stage but, at a rate of 0.5 litres per litre of catalyst and per hour, they were instead supplied to a reactor to which hydrogen was also supplied in such a quantity that the volumetric ratio of hydrogen to paraffin was equal to approximately 5:1. The reactor, which was maintained at 10 kg./sq. cm. and 180° C., contained a hydrogenation catalyst consisting of palladium supported on alumina in a quantity equal to 0.5% by weight in the form of small cylinders 4 mm. in size.

The emerging product was passed, together with fresh commercial paraffins in a quantity equal to 30% by weight, to the chlorination stage.

There was thus a reduction in the chlorine concentration in the alkyl benzenes produced to approximately 15 p.p.m., the content of aromatic products falling to below 0.05% upon ultra-violet determination, values which were maintained during the whole operation of the plant.

The high grade linear alkyl benzenes produced were furthermore free of any disagreeable odors.

What we claim is:

1. In a process for preparing linear alkylbenzenes comprising the steps of:
    partially chlorinating linear paraffins having 9 to 15 carbon atoms to form chlorinated paraffins,
    alkylating excess benzene with the chlorinated paraffins in the presence of a catalyst,
    separating the catalyst from the reaction mixture,
    fractionating the reaction mixture and recycling the unreacted benzene and paraffins to the alkylation and chlorination stages, respectively,
the improvement which comprises subjecting the unreacted paraffins recovered from the fractionation stage to a hydrogenation treatment over catalysts consisting of elements belonging to the platinum family, in metallic form, supported on a sub-divided inert medium, at a temperature comprised in the range of 50 to 300° C. and at a pressure comprised in the range of 1 to 40 kg./cm.$^2$, and at a volumetric ratio of hydrogen to paraffin of from 1:1 to 10:1, before recycling said paraffins to the chlorination stage.

2. Process according to claim 1, in which palladium metal, supported on alumina in granular form, is used as the hydrogenation catalyst, the ratio by weight of palladium metal to support being from 0.001 to 0.1:1.

3. Process according to claim 1, in which the rate of supply of the paraffins is so regulated that it is comprised in the range from 0.1 to 2 litres of recycled liquid paraffins per litre of catalyst and per hour.

4. Process according to claim 1, in which the temperature is 150° to 200° C.

5. Process according to claim 1, in which the pressure is 5 to 20 kg./sq. cm.

6. Process according to claim 1, in which the ratio hydrogen:paraffin is 5 to 6:1.

References Cited

UNITED STATES PATENTS

| | | | |
|---|---|---|---|
| 3,657,371 | 4/1972 | Calcagno et al. | 260—671 B |
| 3,454,666 | 7/1969 | Jacobs et al. | 260—671 B |
| 3,646,238 | 2/1972 | Jacobs | 260—671 B |

CURTIS R. DAVIS, Primary Examiner